United States Patent [19]

Kawamoto

[11] 4,120,383
[45] Oct. 17, 1978

[54] PARKING BRAKE MECHANISM FOR MOTOR VEHICLE EQUIPPED WITH AUTOMATIC TRANSMISSION

[75] Inventor: Tamio Kawamoto, Sagamihara, Japan

[73] Assignee: Nissan Motor Company, Limited, Yokohama, Japan

[21] Appl. No.: 784,613

[22] Filed: Apr. 4, 1977

[30] Foreign Application Priority Data

Apr. 5, 1976 [JP] Japan .................................. 51-37068

[51] Int. Cl.² ............................................. B60T 1/00
[52] U.S. Cl. .................................... 188/31; 74/99 R; 74/107; 74/569; 74/577 S; 192/71; 192/93 B
[58] Field of Search ....................... 188/72.2, 82.7, 31, 188/60, 69; 192/71, 93 B, 4 A; 74/567, 569, 568 R, 577 S, 107, 99

[56] References Cited

U.S. PATENT DOCUMENTS

| 2,038,983 | 4/1936 | Browne ............................ 192/4 A |
| 3,207,267 | 9/1965 | Beuchle et al. .................. 188/72.2 |
| 3,900,082 | 8/1975 | Sakamoto et al. ................ 188/69 |
| 4,031,977 | 6/1977 | Grosseau ......................... 192/4 A X |

*Primary Examiner*—George E. A. Halvosa
*Attorney, Agent, or Firm*—Bacon & Thomas

[57] ABSTRACT

A spring-loaded cam plate is pivotally mounted on an outer inclined surface of a brake pawl having at its inner surface a tooth, the cam plate being pivotable relative to the brake pawl along the outer inclined surface. A driver operable control rod is formed with a cut out portion forming an wedge surface including a large inclined first section near the bottom of the cut out portion and a small inclined second section. The first and second sections are selectively engageable with a free end of the cam plate upon axial movement of the control rod to urge the brake pawl to disengage from or engage with the parking gear.

6 Claims, 10 Drawing Figures

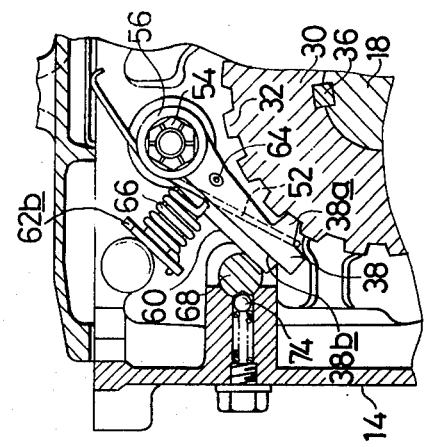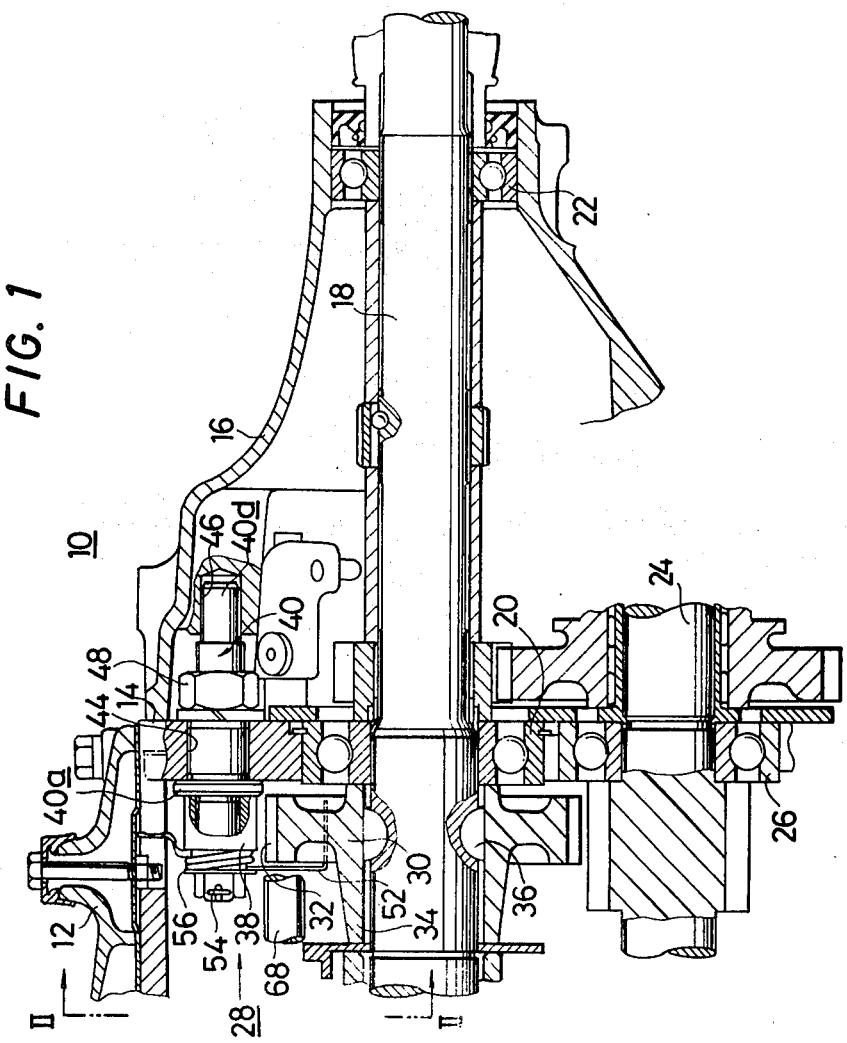

to the numeral 10 and includes therein an improved parking brake mechanism according to the present invention.

PARKING BRAKE MECHANISM FOR MOTOR VEHICLE EQUIPPED WITH AUTOMATIC TRANSMISSION

FIELD OF THE INVENTION

The present invention relates in general to brakes, and more particularly to a parking brake mechanism for use with an automotive automatic power transmission.

BACKGROUND OF THE INVENTION

As well known in the art, motor vehicles having automatic power transmissions are usually equipped with parking brake mechanisms which are capable of anchoring output shafts of the power transmissions. However, these parking brake mechanisms are constructed bulky due to their complicated constructions thereby requiring relatively big mounting spaces in the transmissions.

SUMMARY OF THE INVENTION

Therefore, it is an object of the present invention to provide a novel and improved parking brake mechanism which is constructed compact in size thereby requiring a minimum amount of space for accommodation in a transmission housing.

It is another object of the present invention to provide an improved parking brake mechanism in which the release operation thereof allowing the free rotation of the transmission output shaft is readily made without requiring big force.

It is still another object of the present invention to provide an improved parking brake mechanism which can maintain its braking operation against the transmission output shaft even when the output shaft is urged to rotate severely because of standing of a vehicle equipped with the mechanism on a steep slope.

BRIEF DESCRIPTION OF THE DRAWINGS

Other objects and advantages of the present invention will become more apparent from the following detailed description when taken in conjunction with the accompanying drawings, in which:

FIG. 1 is a partial cross sectional view of a motor vehicle automatic power transmission equipped with an improved parking brake mechanism according to the present invention;

FIG. 2 is a partial sectional view taken along the line II—II of FIG. 1, showing the parking brake mechanism, but with the modified cam plate of FIG. 7;

DESCRIPTION OF THE PREFERRED EMBODIMENT

Figure 3:
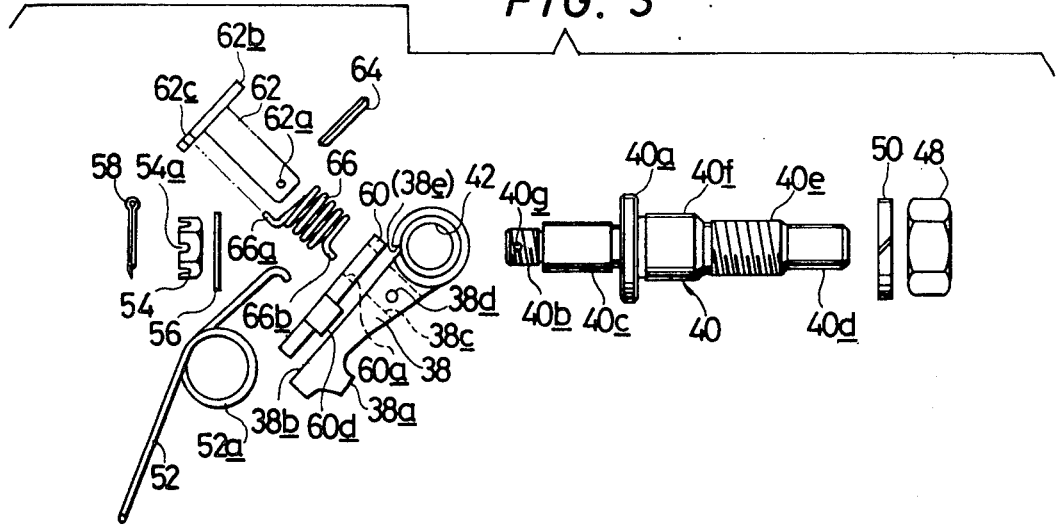
FIG. 3 is an exploded view showing the individual components of the parking brake mechanism shown in FIG. 1.
Figure 4:
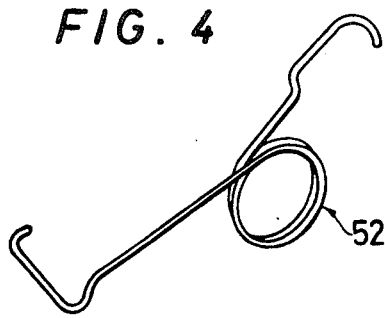
FIG. 4 is a perspective view of a return spring employed in the parking brake mechanism.

Referring to FIG. 1 of the drawings, there is illustrated an automatic power transmission which is generally designated by the numeral 10 and includes therein an improved parking brake mechanism according to the present invention.

The transmission 10 generally comprises a shift gear housing 12, a transmission proper casing 14, a transmission tailshaft extension housing 16, a transmission output shaft 18, bearings 20 and 22 for the output shaft 18, a countershaft 24 and a bearing 26 for the countershaft 24. These parts are operatively incorporated with each other as shown, in a conventional manner.

The improved parking brake mechanism of the subject invention is mounted in a portion indicated by a leading line 28 and comprises a parking gear 30 which has external teeth 32 around the periphery thereof and a hub 34 secured through keys 36 to the power shaft 18 to allow the brake gear 30 to rotate with the output shaft 18.

A brake pawl 38 is employed as part of the parking brake mechanism 28, as well seen in FIG. 2. The brake pawl 38 has a hub (no numeral) pivotally mounted in the casing 14 by a pivot shaft 40 which is arranged parallel to the output shaft 18 and, as shown in FIG. 3, extends through a through hole 42 in the brake pawl 38, a through hole 44 in the transmission casing 14, and a blind hole 46 in the tailshaft extension housing 16. The free end of the brake pawl 38 is formed or provided with a tooth 38a which is engageable with a gap between the adjacent teeth 32 on the parking 30 to lock the same when urged toward the parking gear 30. As well shown in FIG. 3, the pivotal shaft 40 is formed with a flange 40a at its generally middle portion, a threaded portion 40b and a supporting portion 40c at left section of the shaft 40, and a supporting portion 40d, a threaded portion 40e and a supporting portion 40f at right section of the shaft 40. The connection of the pivot shaft 40 to the transmission 10 is made in such a manner, as well illustrated in FIG. 1, that the supporting portions 40d and 40f are respectively and snugly held in the blind hole 44 of the tailshaft extension housing 16 and the through hole 44 of the transmission casing 14, and a nut 48 screwing on the threaded portion 40e contributes substantially to the tight connection between the pivot shaft 40 and the through hole 44 with an assistance of a spring washer 50. While, the pivotal connection between the pivotal shaft 40 and the brake pawl 38 is made such that the supporting portion 40c is slidably held in the through hole 42 of the brake pawl 38.

Figure 6:
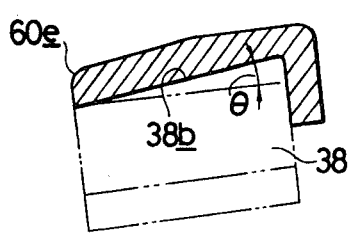
FIG. 6 is a sectional view taken along the line VI—VI of FIG. 5.

It is to be noted, as shown in FIG. 6, that an outer side opposite to the tooth 38a of the brake pawl 38 is formed with a surface 38b which is inclined slightly at $\theta$ relative to the axis of the pivot shaft 40. Preferably the angle $\theta$ is determined about 7 degrees. The reason why such inclination is required will be apparent hereinlater.

A return spring 52 encircles at its multiple turns 52a the threaded portion 40b while engaging at its one end a portion of the shift gear housing 12 and at its other end the tooth 38a of the brake pawl 38 so that the brake pawl 38 is urged radially outwardly away from the teeth 32 of the parking gear 30. A nut 54 is engaged with the threaded portion 40b of the pivot shaft 40 to hold the return spring 52 and the brake pawl 38 in place with an assistance of a spring seat 56. To prevent the nut 54 from being dismantled accidentally from the threaded portion 40b, a stop pin 58 is used passing through an opening 40g formed in a top of the threaded portion 40b while engaging a cut 54a provided in the nut 54.

Figure 5:
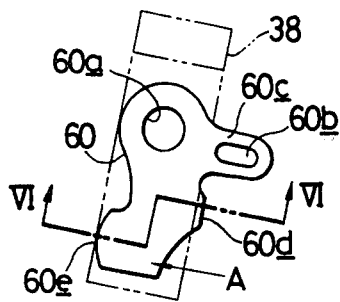
FIG. 5 is a plan view of a cam plate employed in the mechanism of FIG. 1.

A cam plate 60 is pivotally mounted on the inclined surface 38b of the brake pawl 38 by a support pin 62 which extends through a through hole 60a in the cam plate 60 and a through hole 38c in the brake pawl 38. Although not well shown in the drawings, the support pin 62 is arranged perpendicularly to the inclined surface 38b for obtaining the parallel movements of the cam plate 60 with respect to the inclined surface 38b. For tight connection between the support pin 62 and the brake pawl 38, a stop pin 64 is used passing through a hole 38d in the brake pawl 38 and a through hole 62a in the support pin 62, the hole 38d being merged with the before-mentioned through hole 38c into which the support pin 62 is inserted. Thus, it should be noted that the cam plate 60 is not only rotatable or oscillatable about the before-mentioned pivot shaft 40 together with the brake pawl 38, but also oscillatable about the support pin 62 relative to the brake pawl 38 along a plane contaning the inclined surface 38b. The support pin 62 is formed at its top end with a flange 62b having an opening 62c. Encircling the middle portion of the support pin 62 is a coil spring 66 which has one end 66a hooked to the opening 62c of the flange 62b and the other end 66b hooked to an opening 60b formed in a lateral projection 60c of the cam plate 50, the detailed configulation of the cam plate 60 being shown in FIGS. 5 and 6. The coil spring 66 is prestressed to urge the cam plate 60 in a clockwise direction, as viewed along the arrow A illustrated in FIG. 5. In order to limit the movement of the cam plate 60 by the force of the spring 66, a stop portion 60d is formed at one side of the cam plate 60, the stop portion 60d being engageable with the corresponding side of the brake pawl 38. For the reason as will be described hereinlater, the other side of the cam plate 60 is formed with a curved rounded shoulder 60e as shown.

Figure 8A:
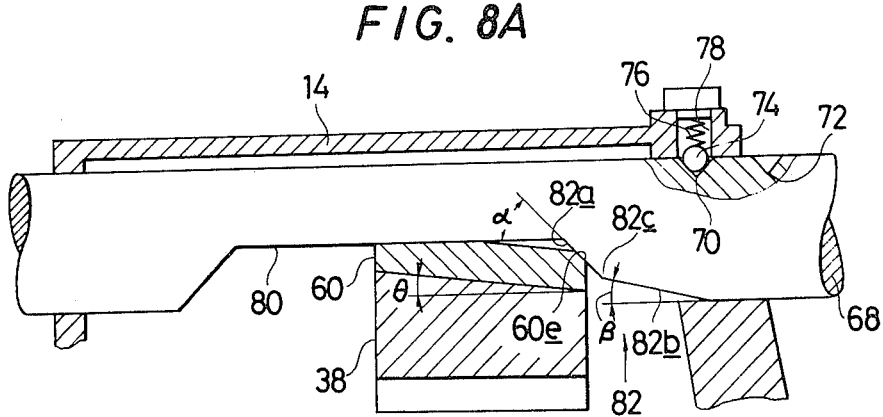
FIGS. 8A to 8C are views showing the relationship between the cam plate sliding on a brake pawl and a control rod under different operating conditions.

As seen in FIGS. 1 and 2, a cylindrical control rod 68, which is connected to any conventional driver operable transmission shift lever (not shown) located in the driver's compartment of the vehicle, axially movably extends in a direction parallel to the axis of the before-mentioned pivot shaft 40. As best seen in FIG. 8A, the control rod 68 is formed at the cylindrical portion thereof with first and second notches 70 and 72. Selectively projecting into the notches 70 and 72 in response to the axial movement of the control rod 68 is a detent ball 74 which is biased toward the control rod 68 by a compression spring 76 disposed in a hole 78 formed in the transmission casing 14. Thus, the control rod 68 takes first and second rest positions in accordance with selective engagement of the notches 70 and 72 with the detent ball 74. The first rest position is induced by the engagement between the notch 70 and the ball 74 when the driver operable transmission shift lever is held in one of the driving positions and neutral position in which positions the rotation of the transmission output shaft 18 is needed. The second rest position is induced by the engagement between the notch 72 and the ball 74 when the shift lever is held in a parking position in which the rotation of the output shaft must be prohibited.

The control rod 68 is further formed at a cylindrical portion opposite to the first and second notches 70 and 72 with an elongate cut out portion 80 which provides a shoulder or wedge surface 82 at a portion near the notches 70 and 72, as shown. The cut out portion 80 receives therein a unit of the cam plate 60 and the brake pawl 38 when the control rod 68 takes the first rest position, as viewed in FIG. 8A, in response to positioning of the transmission shift lever in either the driving positions or the neutral position.

According to the present invention, there is further required the following consideration to configuration of the wedge surface 82.

As best seen in FIG. 8A, the wedge surface 82 includes first and second inclined sections which are respectively designated by the numerals 82a and 82b. The inclination angles of the first and second inclined sections 82a and 82b with respect to the axis of the control rod 68 are respectively designated by the references $\alpha$ and $\beta$. By the subject invention, the angle $\alpha$ is determined considerably larger than $\beta$, and preferably, the angle $\alpha$ is about 45°, while the angle $\beta$ is about 12°. An edge portion formed between the first and second inclined sections 82a and 82b, which is indicated by a reference 82c, is curved at about 5 mm in radius of curvature.

With the above-described construction of the parking brake mechanism 28, the operation thereof is as follows.

While the shift lever is positioned at either the driving positions or the neutral position, the control rod 68 stays in the first rest position, illustrated in FIG. 8A. Under this, the unit of the cam plate 60 and the brake pawl 38 is settled in the cut out portion 80 by the urging force of the return spring 52. (In FIG. 8A, it is shown that the curved rounded shoulder 60e of the cam plate 60 is engaged with the first inclined section 82a of the wedge surface 82 under the first rest position of the control rod 68). Thus, the tooth 38a of the brake pawl 38 is kept separated from the teeth 32 of the parking gear 30 thus permitting the free rotation of the output shaft 18 of the transmission 10.

Figure 8B:
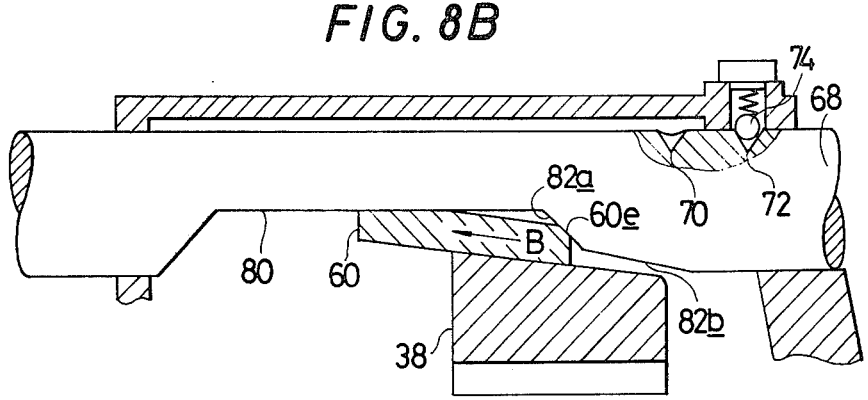
Figure 8C:
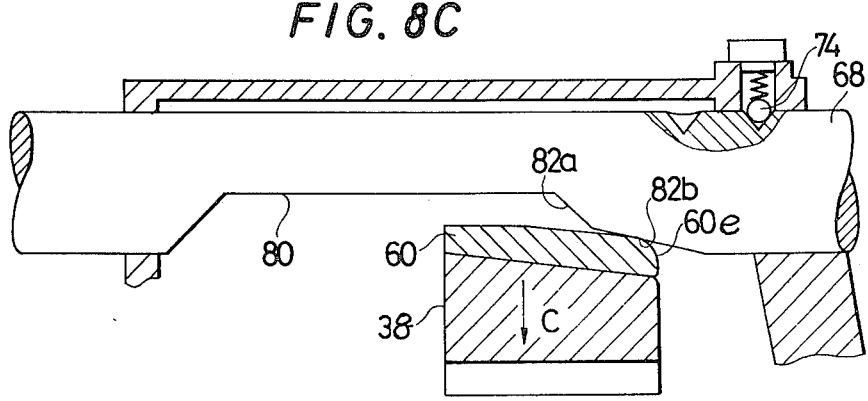

Under this condition permitting the rotation of the output shaft 18, when the shift lever is moved by the driver to a parking position, the control rod 68 is moved leftwardly of the drawing (FIG. 8) into the second rest position in which the detent ball 74 is projected into the notch 72. During this, if the tooth 38a of the brake pawl 38 is now in alignment with the gap between the corresponding adjacent teeth 32 of the parking gear 30, the second inclined section 82b of the wedge surface 82 rides upon the cam plate 60, as shown in FIG. 8c, thereby urging the brake pawl 38 into engagement with the parking gear 30. While, if the tooth 38a is misaligned with the gap between the teeth 32, the first inclined section 82a, remains in abutment against the curved rounded shoulder 60e of the cam plate 60 so that the control rod 68 urges the cam plate 60 to rotate in the leftward direction as indicated by an arrow B in FIG. 8b, overcoming the biasing action of the spring 66. By this leftward movement of the cam plate 60, the tooth 38a of the brake pawl 38 is tightly engaged with an outer surface portion of one of the teeth 32 of the brake gear 30 due to the inclined contact between them 60 and 38. As soon as the tooth 38a of the brake pawl 38 and the gap between the teeth 32 of the parking gear 30 come into alignment upon slight rotation of the parking gear 30, the cam plate 60 is oscillated back in the opposite direction, sliding upon the first and second inclined sections 82a and 82b, until the stop portion 60d of the cam plate 60 abuts against the corresponding one side of the brake pawl 38. By this rightward movement of the cam plate 60, the brake pawl 38 is urged to oscillate in the downward direction, indicated by an arrow C in FIG. 8C, and finally to engage with the parking gear 30. It should be noted that the downward movement or rotation of the brake pawl 38 is made by the force of the spring 66 but against the bias of the return spring 52.

If the vehicle equipped with the subject parking brake mechanism should tend to move or roll forward or backward due to being parked on a slope and the brake pawl 38 is then engaged with the parking gear 30, the rotation of the parking gear 30 will generate a force tending to urge the brake pawl 38 radially outwardly away from the parking gear 30. Due to the angular construction of the upper surface of the brake pawl 38, the cam plate 60 is biased downwardly and to the right, as viewed in FIG. 8c, forcing it directly against the inclined surface 38b whereby the cam plate 60 is prevented from sliding up the inclined surface 38b. This phenomenon will prevent the subject parking braking mechanism from being accidentally inoperative.

Although in the previous description, the control rod 68 is shown to be formed with the cut out portion 80 to form the wedge surface 82, it is also possible to use a relatively small diameter rod with a raised portion as the control rod. In this case, one side of the raised portion is formed similar to the wedge surface 82, shown in FIG. 8A, including the first and second inclined sections 82a and 82b.

Figure 7:
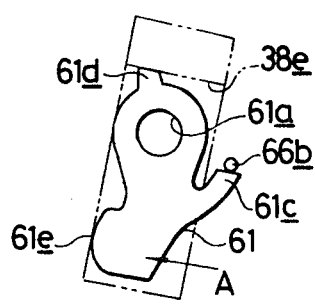
FIG. 7 is a plan view of a modified cam plate.

Furthermore, instead of the previously described cam plate 60, another type cam plate 61 may be employed, which is shown in FIG. 7. The cam plate 61 is formed to have a through hole 61a for the support pin 62, a first lateral projection 61c for engaging the coil spring 66, a second lateral projection 61d engageable with a shoulder portion 38e (see FIG. 3) to limit the movement of the cam plate 61, and a curved edge 61e engageable with the wedge surface 82 of the control rod 68.

It will now be appreciated from the preceeding description that the improved parking brake mechanism according to the present invention can be easily mounted in a conventional transmission by slightly rearranging the gear train of the same, since the subject mechanism is made considerably compact and simple in construction. This makes it possible that the parking gear can have a relatively large size thus providing the subject mechanism with big braking performance.

It is also to be noted that, because of provision of the second inclined section 82b with a small inclination, the release action of the control rod 68 from the cam plate 60 which is then in a condition to urge the brake pawl 30 into engagement with the parking gear 30 is readily made without requiring a considerable force.

By the provision of the first inclined section 82a with a large inclination, the leftward rotation of the cam plate 60 is securely occurred when the control rod 68 is moved leftward under a condition in which the tooth 38a of the brake pawl 38 is misaligned with the gap between the teeth 32. Thus, unwanted violently hard engagement between the tooth 38a of the brake pawl 38 and one of the teeth 32 of the parking gear 30 due to failure of the leftward rotation of the cam plate 60 under such condition is suppressed. Indeed, such drawback has been encountered in the conventional parking brake mechanism.

What is claimed is:

1. A parking brake mechanism for a motor vehicle transmission having a transmission output shaft on which a parking gear is securely mounted, comprising:
    a brake pawl mounted for rotation about a first axis and carrying a tooth engageable with said parking gear;
    first biasing means arranged to bias said brake pawl in a direction to be disengaged from said parking gear;
    a cam plate connected to said brake pawl for rotation therewith about said first axis and for rotation relative to said brake pawl about a second axis;
    a manually operable control rod having a raised portion with a wedge surface, said wedge surface being engageable with said cam plate upon relative axial displacement of said control rod in a direction toward said cam plate, to urge rotation of said brake pawl about said first axis into engagement with said parking gear; and
    second biasing means arranged to bias said cam plate to rotate about said second axis in a first direction toward said wedge surface, to urge engagement of said cam plate with said wedge surface;
    said wedge surface of said control rod including first and second inclined sections which are engageable with said cam plate to produce the rotation of said cam plate about said second axis in a direction opposite to said first direction against the bias of said second biasing means, and the rotation of said cam plate and said brake pawl about said first axis in a direction urging said brake pawl into engagement with said parking gear, respectively, the inclination angle of said first inclined section with respect to the axis of said rod being larger than that of said second inclined section;
    said brake pawl having a surface to which said cam plate is attached in a manner that the cam plate is rotatable about said second axis along a plane containing said surface of said brake pawl, said surface being inclined with respect to said first axis so as to face toward said wedge surface of said control rod.

2. A parking brake mechanism as claimed in claim 1, in which said cam plate has a curved rounded shoulder which is engageable with said first and second inclined sections of said control rod upon the relative axial displacement of said control rod theretoward.

3. A parking brake mechanism as claimed in claim 2, in which said cam plate is formed with a stop portion which abuts against a portion of said brake pawl for stopping excessive movement of said cam plate with respect to said brake pawl upon rotation of said cam plate in said first direction.

4. A parking brake mechanism as claimed in claim 3, further comprising means arranged and operable to allow said control rod to take first and second rest positions, said means being arranged so that when said control rod is in said first rest position said brake pawl can be operated by said first biasing means to disengage said tooth of said brake pawl from said parking gear, and so that when said control rod is in said second rest position said tooth is urged into engagement with said parking gear to prohibit the rotation of said transmission output shaft.

5. A parking brake mechanism as claimed in claim 1, wherein said first axis extends parallel to the axis of said transmission output shaft, and said second axis extends generally perpendicular to said inclined surface on said brake pawl.

6. A parking brake mechanism for a motor vehicle transmission having a transmission output shaft on which a parking gear is securely mounted, comprising:
    a brake pawl mounted for rotation about a first axis and carrying a tooth engageable with said parking gear, said brake pawl being formed with a flat surface which is inclined with respect to said first axis;

first biasing means arranged to bias said brake pawl in a direction to be disengaged from said parking gear;

a cam plate connected to said flat surface of said brake pawl for rotation therewith about said first axis and for rotation relative to said brake pawl about a second axis, said cam plate being rotatable about said second axis along a plane containing said flat surface of said brake pawl;

a manually operable control rod having a raised portion with a wedge surface which is engageable with said cam plate upon relative axial displacement of said rod toward said cam plate, said control rod being arranged so that said wedge surface thereof faces the inclined flat surface of said brake pawl, said wedge surface including first and second inclined sections which are engageable with said cam plate upon relative axial movement of said rod theretoward to produce the rotation of said cam plate about said second axis in a direction to slide up over said inclined flat surface and the rotation of said cam plate and said brake pawl about said first axis in a direction urging said brake pawl into engagement with said parking gear, respectively, the angle of inclination of said first inclined section with respect to the axis of said control rod being larger than that of said second inclined section; and second biasing means arranged to bias said cam plate to rotate about said second axis, in a direction to slide down over the inclined flat surface of said brake pawl.

* * * * *